United States Patent [19]
Seip

[11] 4,455,829
[45] Jun. 26, 1984

[54] MECHANICALLY CONTROLLED POWER BRAKE UNIT

[75] Inventor: Hermann Seip, Bad Vilbel, Fed. Rep. of Germany

[73] Assignee: Alfred Teves GmbH, Frankfurt am Main, Fed. Rep. of Germany

[21] Appl. No.: 512,943

[22] Filed: Jul. 12, 1983

Related U.S. Application Data

[63] Continuation of Ser. No. 199,405, Oct. 22, 1980, abandoned, which is a continuation of Ser. No. 019,975, Mar. 12, 1979, abandoned.

[30] Foreign Application Priority Data

Apr. 4, 1978 [DE] Fed. Rep. of Germany ....... 2814419

[51] Int. Cl.³ .............................................. B60T 13/00
[52] U.S. Cl. ..................... 60/547.1; 92/128; 92/169
[58] Field of Search ............... 60/547 R, 583, 593, 60/594, 548, 552, 553, 554, 551; 248/27.1; 92/169, 170, 128; 91/369 R, 369 A, 369 B, 376 R

[56] References Cited

U.S. PATENT DOCUMENTS

| 2,896,585 | 7/1959 | Ingres | 60/551 |
| 3,040,535 | 6/1962 | Randol | 60/554 |
| 3,127,966 | 4/1964 | Sheriff | 60/547 R |
| 3,200,597 | 8/1965 | Stotz | 60/594 |
| 3,222,868 | 12/1965 | Stelzer | 60/551 |
| 3,382,676 | 5/1968 | Tenniswood | 60/594 |
| 3,408,815 | 11/1968 | Stelzer | 60/553 |
| 3,408,899 | 11/1968 | Golden | 92/169 |

Primary Examiner—Abraham Hershkovitz
Attorney, Agent, or Firm—James B. Raden; Marvin M. Chaban

[57] ABSTRACT

A power brake unit for an automotive vehicle comprising a booster utilizing the pressure difference between a vacuum and atmospheric pressure including a vacuum casing composed of a cup shell and a cover shell, and a master cylinder secured to or formed integral with the cup shell. The entire unit is fastened to the splash wall of a vehicle by a fastening means secured to the cup shell adjacent the master cylinder. This fastening arrangement reduces substantially lost travel of the brake pedal due to extension of the vacuum casing in prior art power brake units caused by brake actuating forces and enable employment of lighter weight materials for the power brake unit.

8 Claims, 2 Drawing Figures

MECHANICALLY CONTROLLED POWER BRAKE UNIT

CROSS REFERENCE TO RELATED APPLICATION

This application is a continuation, of application of Ser. No. 199,405 filed Oct. 22, 1980, now abandoned, which is a continuation of Ser. No. 019,975, filed Mar. 12, 1979, now abandoned.

BACKGROUND OF THE INVENTION

This invention relates to a power brake unit and particularly to a mechanically controlled power brake unit for an automotive vehicle having a master cylinder and a booster utilizing the pressure difference between a vacuum and atmospheric pressure.

From U.S. Pat. No. 3,222,868, a power brake unit is known including a vacuum casing comprising a cup shell and a cover shell, a working piston movable therein including a diaphragm, and a push rod. A master cylinder of a hydraulic brake system is fastened to the front end of the cup shell of the vacuum casing. Bolts are provided on the cover shell which serve to secure the whole unit—power brake unit and master cylinder—to the vehicle.

A similar power brake unit is described in German Patent No. 1,131,534. In this specification, the master cylinder is provided with an annular flange which is designed as the bottom member for the cylinder of the booster and has the master cylinder bolted thereto. The other end of the booster cylinder is secured to the splash wall, with a cover shell being inserted therebetween.

In arrangements of this type, the parts of the vacuum casing are conventionally made of sheet steel and the master cylinder is made of a grey cast iron casting or a light metal casting. To increase the mechanical load-carrying ability, the vacuum casing parts may be reinforced. When the brake pedal is depressed, the force transmitted from the brake pedal and the booster force are effective in the push rod. The sum of the forces acts on the piston of the master cylinder, the development of a hydraulic pressure in the master cylinder requiring, however, the corresponding forces to be transferred to the booster casing. These forces cause a relatively large extension of the vacuum casing, resulting ultimately in an increased lost travel of the brake pedal.

Further, the known arrangements are unable to comply with the vehicle manufacturer's demand for a lowest possible weight for the brake systems without the safety and operability of the power brake unit being impaired. While it is possible to substitute light metal parts for the sheet steel parts, the resulting increase in the production costs would be substantial. In addition, this measure would not improve the brake pedal's lost travel.

SUMMARY OF THE INVENTION

It is, therefore, an object of the present invention to provide a power brake unit of the type referred to above, which provides a substantial reduction in the brake pedal's lost travel and a marked reduction in the weight of the power brake unit.

A feature of the present invention is the provision of a mechanically controlled power brake unit for an automotive vehicle comprising: a booster utilizing the pressure difference between a vacuum and atmospheric pressure including a vacuum casing composed of a cup shell and a cover shell; a master cylinder secured to the cup shell; and fastening means to fasten the casing to a splash wall of the vehicles, the fastening means being fastened to the casing adjacent the master cylinder.

The essential advantages of the power brake unit of this invention are:

(a) the lost travel of the brake pedal is reduced substantially by arranging the vehicle fastening means close to the master cylinder;

(b) the weight of the power brake unit is reduced by using other materials and by the elimination of reinforcements;

(c) it enables the casing parts to be made of less expensive and thinner materials; and (d) the negative effects, with respect to the brake pedal lost travel, of the pneumatic forces acting on the casing are eliminated.

Preferably, the master cylinder and the cup shell of the booster casing are integrally formed and made of a light metal casting. Such a design provides high mechanical stability while being of low weight. In addition, the low number of individual components facilitates the assembly of the power brake unit. Further, the position of the piston in the master cylinder can be adjusted more accurately because the reference edge is at a larger distance from the piston than is the case in known arrangements. Particularly suitable as materials for the cover shell because of their low weight are light metal sheets or plastics. In an improvement of the subject matter of this invention, a holding device for a pedal device is provided on the cup shell or on the cover shell of the booster casing. The advantage of this design is that the power brake unit and te pedal holding device can be assembled as a complete unit and adjusted at the place of manufacture, which eliminates the need to adjust the brake pedal and the power brake unit at the time of vehicle assembly.

BRIEF DESCRIPTION OF THE DRAWING

Above-mentioned and other features and objects of this invention will become more apparent by reference to the following description taken in conjunction with the accompanying drawing, in which.

DESCRIPTION OF THE PREFERRED EMBODIMENTS

Figure 1:
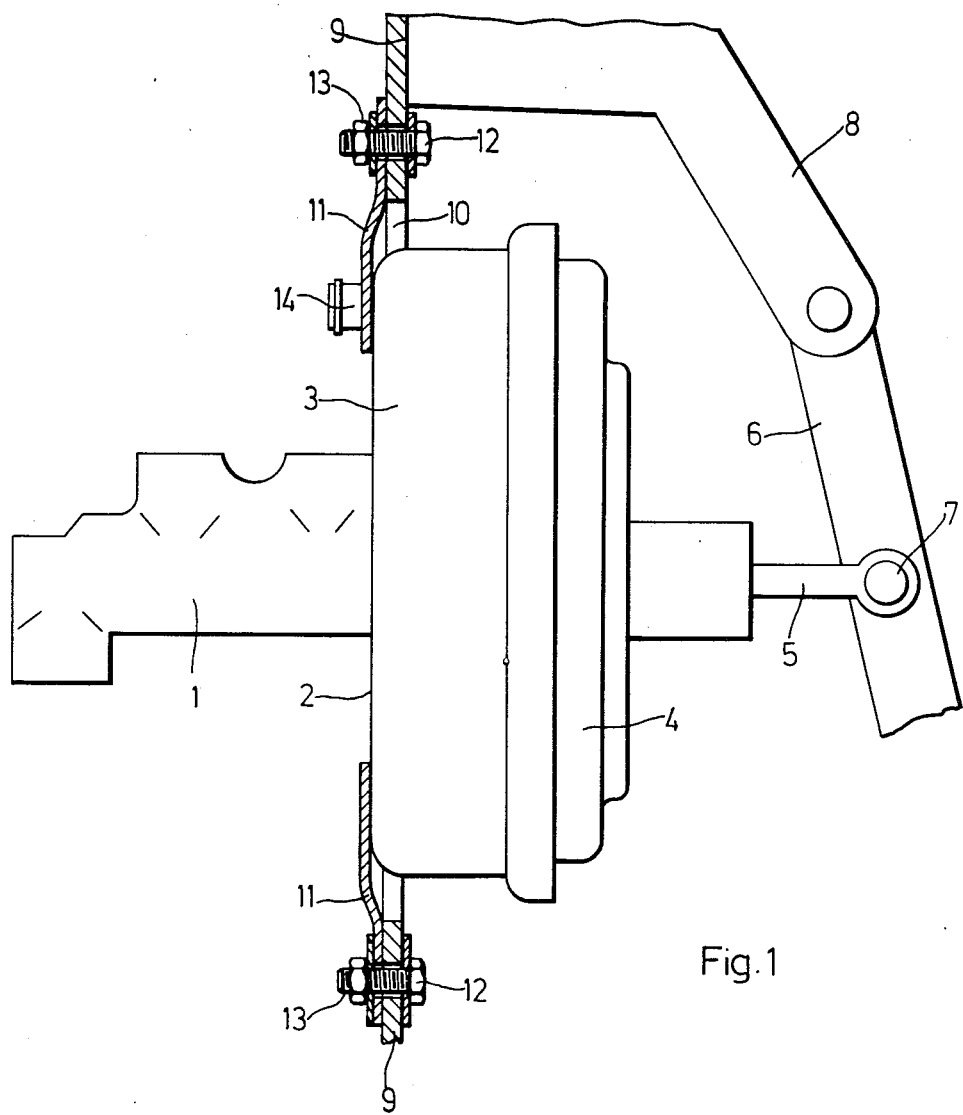
FIG. 1 shows a power brake unit with fastening means disposed close by the master cylinder.

FIG. 1 shows a power brake unit including a master cylinder 1 and a vacuum casing 2. Casing 2 is comprised of a cup shell 3 and a cover shell 4. A push rod 5, which extends out of cover shell 4, is connected with a brake lever 6 through a swivel joint 7. One end of brake lever 6 is pivotably supported by a pedal-holding device 8 which is secured to a splash wall 9. Splash wall 9 includes a large cutout 10 accommodating vacuum casing 2. Welded to the side of cup shell 3 close to master cylinder 1 are strips of sheet metal 11 which are secured to splash wall 9 by means of bolts 12 and nuts 13. A vacuum intake port 14 is disposed in cup shell 3.

The cutout 10 in splash wall 9 may, of course, be of smaller diameter than illustrated in the drawing. In that case it is possible to bolt cup shell 3 directly to splash wall 9. The elements fastening cup shell 3 to splash wall 9 may then be aligned in a plane with the means for fastening master cylinder 1 to cup shell 3.

Figure 2:
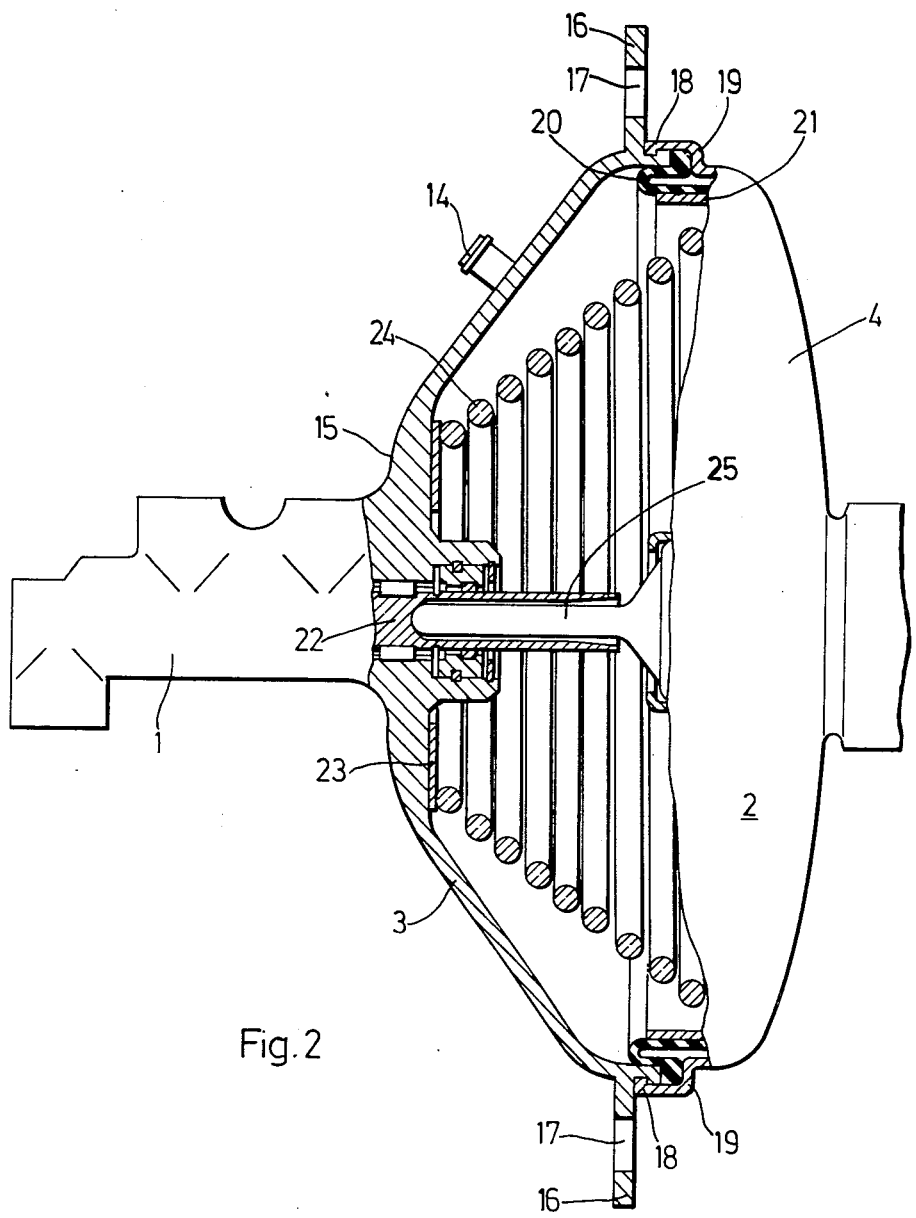
FIG. 2 is a view, partly in section, of a power brake unit in which the master cylinder and the cup shell of the casing are integrally formed.

FIG. 2 shows a power brake unit comprising a light metal casting 15 comprising integrally master cylinder 1 and cup shell 3 of vacuum casing 2 and a separate cover shell 4. On its outer periphery, casing 2 has an integrally cast annular flange 16 including bores 17 to secure the power brake unit to a splash wall (not shown). The edge of cover shell 4 is so designed that a radially inwardly extending projection 18 engages into a peripheral groove on cup shell 3, and that an approximately S-shaped shoulder 19 is provided at a small distance from the edge of cup shell 3. A diaphragm 20 which is disposed in vacuum casing 2 is secured to a working piston 21. The edge of diaphragm 20 is clamped between shoulder 19 of cover shell 4 and the edge of cup shell 3. Working piston 21 is secured to push rod 25 which acts on a piston 22 disposed in master cylinder 1. A washer 23 is provided on the inner side of cup shell 3 adjacent master cylinder 1. A piston return spring 24 is inserted between washer 23 and working piston 21. Vacuum intake port 14 is arranged in cup shell 3.

While I have described above the principles of my invention in connection with specific apparatus it is to be clearly understood that this description is made only by way of example and not as a limitation to the scope of my invention as set forth in the objects thereof and in the accompanying claims.

I claim:

1. A mechanically controlled power brake unit for an automotive vehicle comprising:

a booster utilizing the pressure difference between a vacuum and atmospheric pressure including a vacuum casing composed of a cup shell and a cover shell, said booster being mechanically controlled by a brake pedal operable by a driver of said vehicle, at least a portion of said casing shell extending through an opening in a splash wall of said vehicle distinct from said casing, said opening encircling said portion of said casing;

a master cylinder secured to an end wall of said cup shell parallel to said splash wall, said master cylinder having a master cylinder piston therein operable by said booster; and fastening means to fasten said casing to said splash wall, said fastening means including at least two strip-like members extending in opposite directions along a common diameter of said cup shell, each of said two members having one end fastened to said cup shell adjacent the periphery thereof and a portion adjacent the other end thereof fastened to said splash wall.

2. A unit according to claim 1, wherein
said master cylinder is fastened to said cup shell in a given plane, and
said fastening means is fastened to said cup shell in said given plane.

3. A unit according to claim 1, wherein
said master cylinder and said cup shell are integrally formed by a light metal casting.

4. A unit according to claim 3, wherein
said cover shell is made of a light metal sheet.

5. A unit according to claim 3, wherein
said cover shell is made of a plastic material.

6. A unit according to claim 1, further including
a holding device for a brake pedal arrangement coupled to said cup shell.

7. A unit according to claim 1, wherein
said cover shell is made of a light metal sheet.

8. A unit according to claim 1, wherein
said cover shell is made of a plastic material.

* * * * *